United States Patent [19]

Heitz et al.

[11] Patent Number: 4,677,185

[45] Date of Patent: Jun. 30, 1987

[54] PROCESS FOR THE PREPARATION OF BIFUNCTIONAL POLYPHENYLENE OXIDE

[75] Inventors: Walter Heitz, Kirchhain; Wilhelm Risse, Marburg, both of Fed. Rep. of Germany

[73] Assignee: Bayer Aktiengesellschaft, Leverkusen, Fed. Rep. of Germany

[21] Appl. No.: 780,323

[22] Filed: Sep. 25, 1985

Related U.S. Application Data

[63] Continuation-in-part of Ser. No. 665,567, Oct. 29, 1984, abandoned.

[30] Foreign Application Priority Data

Nov. 9, 1983 [DE] Fed. Rep. of Germany ....... 3340493

[51] Int. Cl.$^4$ ............................................. C08G 65/44
[52] U.S. Cl. .................................. 528/212; 528/210; 528/214; 528/215; 528/217; 528/218; 528/219; 564/433; 568/33; 568/638
[58] Field of Search ............... 528/212, 210, 214, 215, 528/217, 218, 219; 568/33, 638; 564/433

[56] References Cited

U.S. PATENT DOCUMENTS

| | | |
|---|---|---|
| 3,219,698 | 11/1965 | Halpern et al. . |
| 3,236,807 | 2/1966 | Stamatoff . |
| 3,257,357 | 6/1966 | Stamatoff . |
| 3,306,879 | 2/1967 | Pattison . |
| 3,313,776 | 4/1967 | Borman . |
| 3,318,959 | 5/1967 | Borman .............................. 568/638 |
| 3,382,212 | 5/1968 | Price et al. . |
| 3,432,469 | 3/1969 | Hay . |
| 3,496,236 | 2/1970 | Cooper et al. ..................... 568/638 |
| 3,749,693 | 7/1973 | Cooper ............................... 568/638 |
| 3,787,361 | 1/1974 | Nakashio et al. . |
| 3,914,266 | 10/1975 | Hay . |
| 3,956,442 | 5/1976 | Boulain . |
| 3,965,069 | 6/1976 | Olander . |
| 4,156,770 | 5/1979 | White . |
| 4,487,918 | 12/1984 | Heitz et al. ........................... 528/125 |
| 4,521,584 | 6/1985 | Heitz et al. ........................... 528/216 |

FOREIGN PATENT DOCUMENTS

1030899  9/1974  Japan .................................. 528/212

OTHER PUBLICATIONS

R. W. Hoffmann, "Dehydrobenzene and Cycloalkynes", pp. 66–68, Academic Press (1967).
Bottini et al, "Mechanisms for Liquid Phase Hydolyses of Chlorobenzene and Halotoluenes", *J. Am. Chem. Soc.*, vol. 79, pp. 1458–1462 (1957).
*Journal of Polymer Science*, vol. 61, pp. 135–141 (1962).
*Journal of Polymer Science*, vol. XLIX, pp. 267–275 (1961).
*Journal of Polymer Science: Part A*, vol. 3, pp. 2009–2018 (1965).
*Polymer Letters*, vol. 4, pp. 463–465 (1966).
*Journal of Polymer Science*, vol. 58, pp. 469–490 (1962).
Polymer Chemistry, Abstract Japanese Patent No. 7030355, 10.70.
Netherlands Patents Report, vol. 2, No. 22, 6,413,958, Polyphenyl Ethers.
Derwent Publications, USSR 231,814.
Abstract, Japan Patent No. 6928 511, 11.69.
Polymer Chemistry, Abstract Japanese Patent No. 7031311, 10.70.
*Chemical Abstracts*, 85:33707u.

*Primary Examiner*—Harold D. Anderson
*Attorney, Agent, or Firm*—Connolly & Hutz

[57] ABSTRACT

This invention relates to a new process for the preparation of bifunctional polyphenylene oxides.

6 Claims, No Drawings

PROCESS FOR THE PREPARATION OF BIFUNCTIONAL POLYPHENYLENE OXIDE

This is a continuation-in-part of copending application Ser. No. 665,567 filed Oct. 29, 1984, now abandoned.

This invention relates to a new process for the preparation of bifunctional polyphenylene oxides.

Various processes for the preparation of polyphenylene ethers (polyphenylene oxides) are known.

The formation of polyphenylene ethers by the oxidation of dialkyl phenol has been described, for example, in NL-PS 6,504,925; NL-PS 6,610,017; Fr-PS 1,544,942; Fr-PS 1,523,821; U.S. Pat. No. 3,313,776; U.S. Pat. No. 3,306,879; U.S. Pat. No. 3,432,469; U.S. Pat. No. 3,914,266; U.S. Pat. No. 3,956,442; and U.S. Pat. No. 3,965,069.

According to Nl-PS 6,413,958, polyphenylene ethers are reacted with NaOH and KOH to form polyfunctional polyphenylene ethers.

DE-PS 2,822,856 describes the preparation of polyphenylene oxides containing two hydroxyl end groups. In this process, polyphenylene oxides which have not more than one hydroxyl group receive a further hydroxyl group by the incorporation of quinones.

The preparation of polyphenylene ethers from halo-substituted phenols is also known. 4-halo-2,6-disubstituted phenols are polymerised by phase interface polymerisation in the presence of oxidizing agents (J. Polymer Sci. 61, 135 (1962); J. Polymer Sci, 49, 267 (1961); J. Polymer Sci. A3, 2009 (1965); J. Polymer Sci. B4, 436 (1966); U.S. Pat. Nos. 3,219,698, 3,236,807, 3,257,357, 3,342,892, 3,382,212).

In this method of preparation, the halo-substituted phenol is present in an organic solvent while the base, KOH or NaOH, is in the aqueous phase. The oxidizing agents used may be, for example, $PbO_2$, $K_3Fe(CN)_6$, benzoyl peroxide, $Pb(OAc)_4$, inorganic peroxides, $I_2$ or 2,4,6-tritertiary butyl-phenoxy radicals.

The polymerisation of halo-substituted phenols in the homogeneous phase, using equimolar quantities of Cu and amine catalysts has been described, for example, in J. Polymer Sci. 58, 469 (1962) and USSR-PS 231,814.

Catalysts which are capable of polymerising phenols containing one hydroxyl group, e.g. also halo-substituted phenols, have been described in JP-PS 6,928,511, 7,031,311, 7,030,355 and De-OS 2,061,116.

The copolymerisation of halo-substituted phenols with bisphenols, on the other hand, has not hitherto been described.

The present invention provides a process for the preparation of polyphenylene ethers (polyphenylene oxides) containing two hydroxyl groups, corresponding to general formula (I):

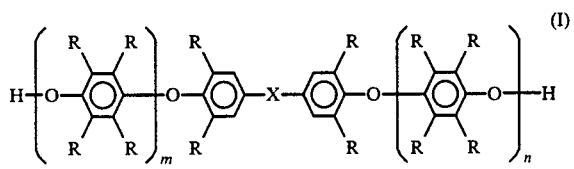

wherein
R may be identical or different and represent a hydrogen atom or an alkyl group having 1 to 4 carbon atoms, preferably hydrogen or methyl, or an alkoxy group having 1 to 4 carbon atoms, preferably methoxy, or an aryl group having 6 carbon atoms, X represents a group of the formula

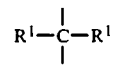

wherein $R^1$ represents a hydrogen atom or an alkyl group having 1 to 4 carbon atoms, O,

or $-SO_2-$, and m and n represent integers from 1 to 200, preferably from 5 to 60, characterised in that a mixture of phenols of formulae (II) and (III)

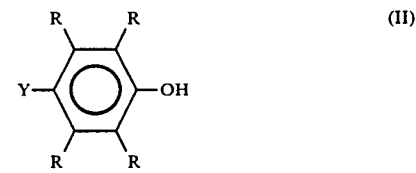

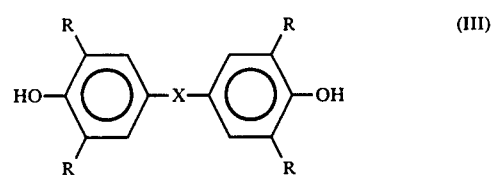

wherein X and R have the meanings indicated for formula (I) and Y represents Cl, Br or I are reacted together.

In a preferred embodiment of the process according to the invention, homopolymers of phenols of formula (II) may be reacted with homopolymer of phenols of formula (III).

The reaction is carried out in the presence of an oxidizing agent and a base at a temperature of from −80° C. to 150° C. It may be carried out in an organic solvent or in a diphasic system in which one phase is an organic solvent and the other phase is water.

The organic solvent may be, for example, aromatic solvents such as benzene, toluene, ethyl benzene, nitrobenzene, chlorobenzene or pyridine, or a halogenated hydrocarbon, e.g. an aliphatic compound such as chloroform, carbon tetrachloride, dichlorethane, trichloroethane, tetrachloroethane, trichloroethylene or tetrachloroethylene.

The oxidizing agent may be, for example, elementary iodine ($I_2$) $PbO_2$, $K_3Fe(CN)_6$, $Pb(OAc)_4$, inorganic persulphates such as $(NH_4)_2S_2O_8$ or metal compounds, e.g. halides, sulphates, carboxylates or oxides of elements of the first, seventh and eighth sub-group of Mendelejeff's periodic system (Hofman, Rudorff, Anorganische Chemie, 19th Edition, page 97, Vieweg Verlag 1966), such as CuCl, CuBr, $Cu_2SO_4$, $CuCl_2$, $CuBr_2$, $MnCl_2$, $Ag_2O$, Cu(II)acetate, Ci(II)formate, $Cu(NO_3)_2$, $Cu_2A_2B_2(OR)_2$ (A=amine, B=Cl or Br, R=hydrogen or methyl), bis-cyclopentadienyl manganese, Mn(II- )acetate, Mn(NO$_3$)$_2$, Mn(OH)$_2$ or cobalt chelate complexes, e.g.

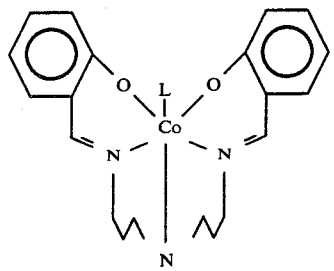

L=H$_2$O, pyridine in combination with chlorides, carboxylates or acetyl acetonates of the eigth subgroup of Mendelejeff's periodic system (e.g. NiCl$_2$.6H$_2$O; CoCl$_2$.6H$_2$O; FeCl$_2$; Co(II)acetate; nickel(II)acetate, Nickel(II)acetylacetonate) or mixtures of Cu(NO$_3$)$_2$ with PdCl$_2$, Pd(OAc)$_2$, RuCl$_3$ or RhCl$_3$.

The metal compounds may if necessary be raised to the stage of oxidation suitable for the process by a reaction with molecular oxygen. The oxidizing agents may be used singly or as mixtures.

The bases used may be amines such as pyridine, methyl pyridines, 4-dimethylaminopyridine, poly-4-vinyl pyridine, piperidine, morpholine, triethanolamine or open chain aliphatic amines such as n-butylamine, octylamine, dibutylamine, N,N-dimethyl-n-hexylamine, triethylamine, N,N'-ditertiary butyl-ethylene diamine, N,N,N',N'-tetramethylethylene diamine, N,N,N', N'-tetramethyl-propylene diamine, N,N,N',N'-tetramethyl-1,3-diaminobutane, 2-aminoethane thiol, 2-mercaptoethanol, 2-mercapto acetic acid, 1,2-dimercapto-4-methyl benzene, disodium-1,2-dicyanoethylene dithiolate, dimeric capromaleic acid monoamide, Schiff's bases and hydrazones of benzoin, polymer complexes containing bis-(ethylene-1,2-dithiolate)-Cu(II)- and -Cu(II)-phthalocyanine structures, and oxides, hydroxides, amides and alcoholates of elements of the 1st and 2nd main group of Mendelejeff's periodic system, such as Li$_2$O, NaOH, KOH, Ca(OH)$_2$, sodium methylate, potassium tertiary butylate or lithium diisopropylamide, and ammonium compounds such as NH$_4$OH, tetra-n-butylammonium hydroxide or benzyl-trimethyl ammonium methylate. The bases may be used individually or as mixtures.

The reaction according to the invention is carried out at a temperature in the range of $-80°$ C. to $150°$ C., preferably at $0°$ to $100°$ C.

The phenol of general formula (II) is used in a quantity of 1 to 400 mol per mol of phenol of formula (III). The quantity of oxidizing agent used is $1 \times 10^{-5}$ to 1 mol per mol of the phenol of general formula (II).

The process according to the invention may be carried out as follows.

METHOD 1

The oxidizing agent and the base are introduced in an organic solvent into the reaction vessel and brought into contact with oxygen or air. The monomer mixture of phenols of formulae (II) and (III) is added in the form of a solution in the organic solvent. The reaction mixture is left at the reaction temperature for a period which may vary from a few minutes to several days, optionally under an inert gas, e.g. N$_2$ or Ar. The bifunctional polyphenylene oxide is isolated, for example by precipitation with an alcohol Instead of the phenols of formulae (II) and (III), the corresponding metal phenolates of elements of the 1st and 2nd main group of Mendelejeff's periodic system may be used.

METHOD 2

The oxidizing agent is introduced into the reaction vessel as described in Method 1 but instead of a mixture of the monomeric phenols of formula (II) and (III), only the phenol of formula (II) is initially added. After a reaction time varying from a few minutes up to several days, the phenol of formula (III) is added, and the reaction mixture is again left at the reaction temperature for a period varying from a few minutes up to several days. Isolation of the bifunctional polyphenylene ether is carried out according to Method 1.

In another embodiment, the intermediate product formed in the first reaction step, consisting of the reaction product of phenol II, may be isolated and then reacted together with the phenol of formula (III) in a second reaction step in the presence of an oxidizing agent. The bifunctional polyphenylene ether is then isolated by Method 1.

METHOD 3

The mixture of the two phenols II and III dissolved in an organic solvent is added to the aqueous solution of a base. The oxidizing agent is then added while the reaction mixture is stirred over a period varying from a few minutes to several hours. After a reaction time varying from a few minutes to several days, the organic phase is separated and concentrated by evaporation to about one quarter of its original volume. Isolation of the polyphenylene ether may be carried out as described in Method 1.

Analyses of the reaction product may be carried out by the usual methods (e.g. vapour pressure osmometric determination of the molecular weight or determination of the phenolic OH number, e.g. by titration).

Both symmetric and asymmetric bifunctional polyphenylene ethers may be prepared by the process according to the invention. Products which are symmetric within the meaning of this invention are obtained when the phenols of formulae (II) and (III) used for the process carry the same substituents R.

The process according to the invention may be used to prepare polymer blocks containing two functional end groups and having a high glass transition temperature. These blocks may be converted into high molecular weight compounds, for example by reacting them with acid chlorides such as phosgene, tetraphthaloyl chloride, diisocyanates, carbonates or other polymer blocks. Materials produced from these high molecular weight compounds are distinguished by their high dimensional stability under heat.

CIP-Disclosure

The bi-functional blocks can be used for building up block-copolymers from polyphenyleneoxide/polyamide; polyphenyleneoxide/polyester; polyphenyleneoxide/polyurethane.

When the block-copolymeres are formed, the terminal OH-Groups of the bi-functional polyphenyleneoxide-blocks react with those groups of the other polymer, which are capable to react, for example terminal acid-chloride- or ester groups in a chemical reaction and form chemical bonds.

Block-copolymers, modified with bi-functional polyphenyleneoxides show improved properties, e.g. better flame resistance, better heat resistance.

EXAMPLES 1. (Method 1)

0.03 g of CuCl (0.3 mMol) and 0.08 g of 4-dimethylaminopyridine (0.66 mMol) in 5 ml of pyridine are introduced into an open, 50 ml reaction vessel. After this mixture has been exposed to atmospheric oxygen for 20 minutes with stirring, a mixture of 0.34 g of 4-bromo-2,6-dimethylphenol (1.7 mMol) and 0.31 g of 2,2-bis-(3,5-dimethyl-4-hydroxyphenyl)propane (1.1 mMol) in 5 ml of pyridine is added at room temperature. After a further 5 minutes, 0.12 g of potassium tertiary butylate is added. This results in brief, spontaneous heating of the reaction mixture to about 40° C. After a reaction time of 30 minutes, 30 ml of chloroform are added to the reaction mixture, and the mixture is then washed twice with 5 ml portions of a 20% aqueous EDTA (EDTA=ethylene diaminotetraacetate) trisodium salt solution, 3 times with 10 ml portions of a 15% aqueous HCl solution and twice with 10 ml portions of a 10% aqueous NaHCO$_3$ solution and twice with distilled water.

After drying over MgSO$_4$, the solvent is distilled off in a water jet vacuum at 40° C. 0.45 g of oligomeric product is obtained (88% of the theoretical yield, vapor pressure osmometric determination of average molecular weight: M=720, titrated functionality of phenolic OH groups=2.14).

2. (Method 1)

0.06 g of CuCl (0.61 mMol), 0.17 g of 4-dimethylamino pyridine (1.4 mMol), 2 ml of pyridine and 5 ml of chloroform are introduced into a 100 ml 2-necked flask with gas inlet tube, reflux condenser and gas outlet attachment.

Oxygen is introduced into this mixture for 15 minutes with stirring. The stream of oxygen is then replaced by nitrogen. To this reaction mixture is added a solution of 0.57 g of 4-bromo-2,6-dimethylphenol (2.8 mMol) and 0.2 g of 2,2-bis-(3,5-dimethyl-4-hydroxyphenyl)propane (0.7 mMole) dissolved in 10 ml of chloroform. The reaction vessel is heated to 50° C. in an oil bath for 2.5 hours.

The reaction solution is worked up by shaking it, in each case twice, with 5 ml portions of a 20% aqueous EDTA trisodium salt solution, 5 ml portions of a 15% aqueous HCl solution and 5 ml portions of a 10% aqueous NaHCO$_3$ solution, and finally with distilled water.

After drying and removal of the solvent by distillation, 0.49 g of an oligomeric product is obtained (90% of the theoretical yield, osmometric average molecular weight determination=489, titrated functionality of phenolic OH groups=1.59).

3. (Method 1)

0.04 g CuCl (0.4 mMol), 0.14 g of 4-dimethylaminopyridine (1.1 mMol) and 5 ml of chlorobenzene are introduced into an open 100 ml reaction vessel and exposed to atmospheric oxygen for 20 minutes with stirring. To this solution are added 0.32 g of 2,2-bis-(3,5-dimethyl-4-hydroxyphenyl)-propane (1.1 mMol) and 2.16 g of 4-chloro-2,6-dimethylphenol (13.8 mMol) in 20 ml of chlorobenzene. After the addition of 1.4 g of potassium tertiary butylate (12.5 mMol), the reaction vessel is closed. After a reaction time of 30 minutes, the reaction mixture is introduced into 100 ml of methanol to which 2 ml of conc. HCl have been added. The precipitated polymer is filtered and washed with methanol. To remove any potassium chloride which has precipitated at the same time, the polymer is dissolved in chloroform and the solution obtained is filtered and re-precipitated with methanol.

0.98 g of polymer is obtained (49% of the theoretical yield molecular weight average M=1820, titrated functionality of phenolic OH groups=1.72).

4. (Method 3)

A solution of 5 g of KOH in 200 ml of water is introduced under nitrogen into the reaction apparatus consisting of a 1 liter 3-necked flask equipped with dropping funnel and gas inlet tube. To this solution is added a solution of 0.57 g of 2,2-bis-(3,5-dimethyl-4-hydroxyphenyl)-propane and 8 g of 4-bromo-2,6-dimethylphenol in 200 ml of benzene. 1.3 g of K$_3$Fe(CN)$_6$ dissolved in 20 ml of H$_2$O are added at room temperature within 30 minutes with stirring. The reaction mixture is left at room temperature for a further 15 minutes and the organic phase is then separated by means of a separating funnel. The organic phase is concentrated by evaporation to 50 ml and poured into a mixture of 200 ml of methanol and 2.5 ml of conc. HCl. The polymer is filtered off and washed with 150 ml of methanol. The polymer is then dissolved in 20 to 30 ml of chloroform and again precipitated in methanol.

The product is dried under vacuum. Yield=1.53 g (29% of theoretical yield, molecular weight average M=2930, titrated functionality of phenolic hydroxyl groups=1.7).

We claim:

1. Process for the preparation of polyphenylene ether or polyphenylene oxide having two hydroxyl end groups, corresponding to formula (I):

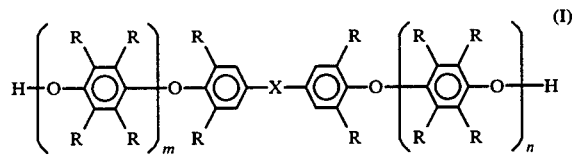

wherein

R is identical or different and represents hydrogen, an alkyl group having 1 to 4 carbon atoms, an alkoxy group having 1 to 4 carbon atoms or an aryl group having 6 carbon atoms, X represents a group

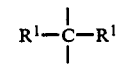

wherein R$^1$ represents hydrogen or an alkyl group having 1 to 4 carbon atoms, O,

or SO$_2$, and m and n represent integers from 1 to 200, wherein a mixture of phenols of formula (II) and (III)

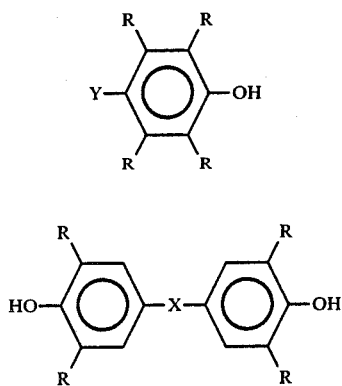

wherein X and R have the meaning indicated in formula (I) and Y represents Cl, Br or I, are reacted together in the presence of $1 \times 10^{-5}$ to 1 mol per mol of phenol (II) of $K_3Fe(CN)_6$, copper halide copper sulphate, copper carboxylate or copper oxide.

2. Process according to claim 1, wherein a homopolymer of phenols of formula (II) is reacted with a homopolymer of phenols of formula (III).

3. Process according to claim 1, which is carried out in an organic solvent.

4. Process according to claim 1, which is carried out in a two-phase solvent system.

5. Process according to claim 1, wherein the process is carried out in the presence of an oxidizing agent.

6. Process according to claim 1, wherein the process is carried out in the presence of a base.

* * * * *